(12) United States Patent
Liu et al.

(10) Patent No.: US 10,197,832 B2
(45) Date of Patent: Feb. 5, 2019

(54) FRAME ASSEMBLY AND DISPLAY DEVICE

(71) Applicants: Radiant Opto-Electronics (Suzhou) Co., Ltd., Jiangsu (CN); Radiant Opto-Electronics Corporation, Kaohsiung (TW)

(72) Inventors: Meng-Hsin Liu, Kaohsiung (TW); Yi-Jen Chiu, Kaohsiung (TW)

(73) Assignees: Radiant Opto-Electronics (Suzhou) Co., Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 197 days.

(21) Appl. No.: 15/104,988

(22) PCT Filed: Dec. 30, 2015

(86) PCT No.: PCT/CN2015/099817
§ 371 (c)(1),
(2) Date: Jun. 16, 2016

(87) PCT Pub. No.: WO2017/031902
PCT Pub. Date: Mar. 2, 2017

(65) Prior Publication Data
US 2017/0199416 A1 Jul. 13, 2017

(30) Foreign Application Priority Data
Aug. 25, 2015 (CN) .......................... 2015 1 0526820

(51) Int. Cl.
*G02F 1/1333* (2006.01)
*F21V 8/00* (2006.01)

(52) U.S. Cl.
CPC ..... *G02F 1/133308* (2013.01); *G02B 6/0088* (2013.01); *G02B 6/0091* (2013.01);
(Continued)

(58) Field of Classification Search
CPC ............ G02F 1/133308; G02B 6/0091; G02B 6/0088
See application file for complete search history.

(56) References Cited

U.S. PATENT DOCUMENTS

| 2009/0009680 A1 | 1/2009 | Zensai |
| 2011/0157844 A1 | 6/2011 | Chan et al. |
| 2013/0215359 A1* | 8/2013 | Chun .................... G02F 1/1333 349/58 |

FOREIGN PATENT DOCUMENTS

| CN | 1584690 A | 2/2005 |
| CN | 201307203 Y | 9/2009 |

(Continued)

*Primary Examiner* — Sharon E Payne
(74) *Attorney, Agent, or Firm* — CKC & Partners Co., Ltd.

(57) ABSTRACT

A frame assembly and a display device are provided. The frame assembly includes a back plate, a first frame and a fixing assembly. The back plate comprises at least one side edge, and the side edge has an extending direction. The first frame is combined with the back plate. The fixing assembly includes at least one first engaging structure, at least one second engaging structure and a fixing member. The first engaging structure is disposed on the at least one side edge of the back plate. The second engaging structure is disposed on at least one side edge of the first frame. The fixing member is inserted into and combined with the at least one first engaging structure and the at least one second engaging structure along the extending direction.

20 Claims, 9 Drawing Sheets

(52) U.S. Cl.
CPC .............. *G02F 2001/13332* (2013.01); *G02F 2001/133314* (2013.01); *G02F 2001/133317* (2013.01); *G02F 2001/133322* (2013.01); *G02F 2201/46* (2013.01)

(56) References Cited

FOREIGN PATENT DOCUMENTS

| | | |
|---|---|---|
| CN | 102478163 A | 5/2012 |
| CN | 102830513 A | 12/2012 |
| CN | 103364990 A | 10/2013 |
| CN | 205015580 U | 2/2016 |
| EP | 2251721 A1 | 11/2010 |
| JP | H11133393 A | 5/1999 |
| TW | 201115233 A | 5/2011 |
| TW | M432229 | 6/2012 |

\* cited by examiner

FRAME ASSEMBLY AND DISPLAY DEVICE

RELATED APPLICATIONS

This application is the U.S. national phase under § 371 of International Application No. PCT/CN2015/099817 filed Dec. 30, 2015, which claims priority from China Patent Application Serial Number 201510526820.9, filed Aug. 25, 2015. The entire contents of each of which are incorporated by reference.

BACKGROUND

Field of Invention

The present invention relates to a frame assembly and an application thereof. More particularly, the present invention relates to a frame assembly which is applicable to a display device and a display device using the frame assembly.

Description of Related Art

A liquid crystal display mainly includes a backlight module, a liquid crystal display panel and an outer frame. Moreover, a mold frame for carrying the liquid crystal display panel is disposed on the backlight module. After the liquid crystal display panel is disposed on the mold frame, the outer frame is used to fix the mold frame, the liquid crystal display panel and the backlight module, so as to finish assembly of the liquid crystal display.

A common method for fixing the outer frame can be such as locking by screws. However, such method for fixing the outer frame may have many shortcomings. For example, the method of locking by screws may damage the structure of the outer frame and affect its appearance.

SUMMARY

One object of the present invention is to provide a frame assembly and a display device which can be easily processed and have better assembly robustness and appearance.

According to the aforementioned object, a frame assembly is provided. The frame assembly includes a back plate, a first frame and a fixing assembly. The back plate comprises at least one side edge, and the side edge has an extending direction. The first frame is combined with the back plate. The fixing assembly includes at least one first engaging structure, at least one second engaging structure and a fixing member. The first engaging structure is disposed on the at least one side edge of the back plate. The second engaging structure is disposed on at least one side edge of the first frame. The fixing member is inserted into and combined with the at least one first engaging structure and the at least one second engaging structure along the extending direction.

According to an embodiment of the present invention, the aforementioned frame assembly includes a second frame. The back plate is combined between the first frame and the second frame. The fixing assembly further includes at least one third engaging structure disposed on at least one side edge of the second frame. The fixing member is inserted into and combined with the at least one third engaging structure.

According to an embodiment of the present invention, each of the first engaging structure, the second engaging structure and the third engaging structure is an annular structure.

According to an embodiment of the present invention, the aforementioned annular structures are alternately disposed and disposed coaxially with an axis, and the axis is parallel to the extending direction.

According to an embodiment of the present invention, each of the annular structures is an open annular structure or an enclosed annular structure.

According to an embodiment of the present invention, the fixing member includes a head portion and a rod portion connected to the head portion. The rod portion is inserted into the at least one engaging structure, at least one second engaging structure and at least one third engaging structure. An outer profile dimension of the head portion is greater than an inner profile dimension of each of the annular structures.

According to the aforementioned object, a display device is provided. The display device includes the aforementioned frame assembly and a display unit. The display unit is disposed in the frame assembly.

According to an embodiment of the present invention, the aforementioned display unit includes a light guide plate, a light source and a display panel. The light guide plate is disposed on the back plate, in which the light guide plate has a light-incident surface and a light-emitting surface connected to the light-incident surface. The light source is disposed adjacent to the light-incident surface. The display panel is disposed in front of the light-emitting surface.

According to the aforementioned object, another display device is provided. The display device includes a frame assembly and a display unit. The frame assembly includes a first frame, a second frame, a back plate and a fixing assembly. The first frame has at least one side edge. The second frame has at least one side edge, in which the least one side edge of the first frame and the least one side edge of the second frame have an extending direction. The back plate is located between the first frame and the second frame. The fixing assembly includes at least one first engaging structure, at least one second engaging structure and a fixing member. The first engaging structure is disposed on the at least one side edge of the first frame. The second engaging structure is disposed on the at least one side edge of the second frame. The fixing member is inserted into and combined with the at least one first engaging structure and the at least one second engaging structure along the extending direction. The display unit is combined with the back plate of the frame assembly and is located between the first frame and the second frame.

According to an embodiment of the present invention, the aforementioned display unit includes a light guide plate, a light source and a display panel. The light guide plate is disposed on the back plate, in which the light guide plate has a light-incident surface and a light-emitting surface connected to the light-incident surface. The light source is disposed adjacent to the light-incident surface. The display panel is disposed in front of the light-emitting surface.

According to an embodiment of the present invention, one of the first frame and the second frame is engaged and fixed with the back plate.

According to an embodiment of the present invention, the second frame is located behind the back plate of the frame assembly.

According to an embodiment of the present invention, the first frame is located in front of and surrounds the display panel.

According to the aforementioned embodiments of the present invention, the engaging structures are disposed internally in the back plate, the first frame and the second frame, and then the back plate, the first frame and the second frame are jointed together by inserting the fixing member into the engaging structures, thereby greatly reducing the number of the screws and screws holes, and simplifying the structure of the frame assembly and the assembling process thereof, thus making the frame assembling more appealing.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
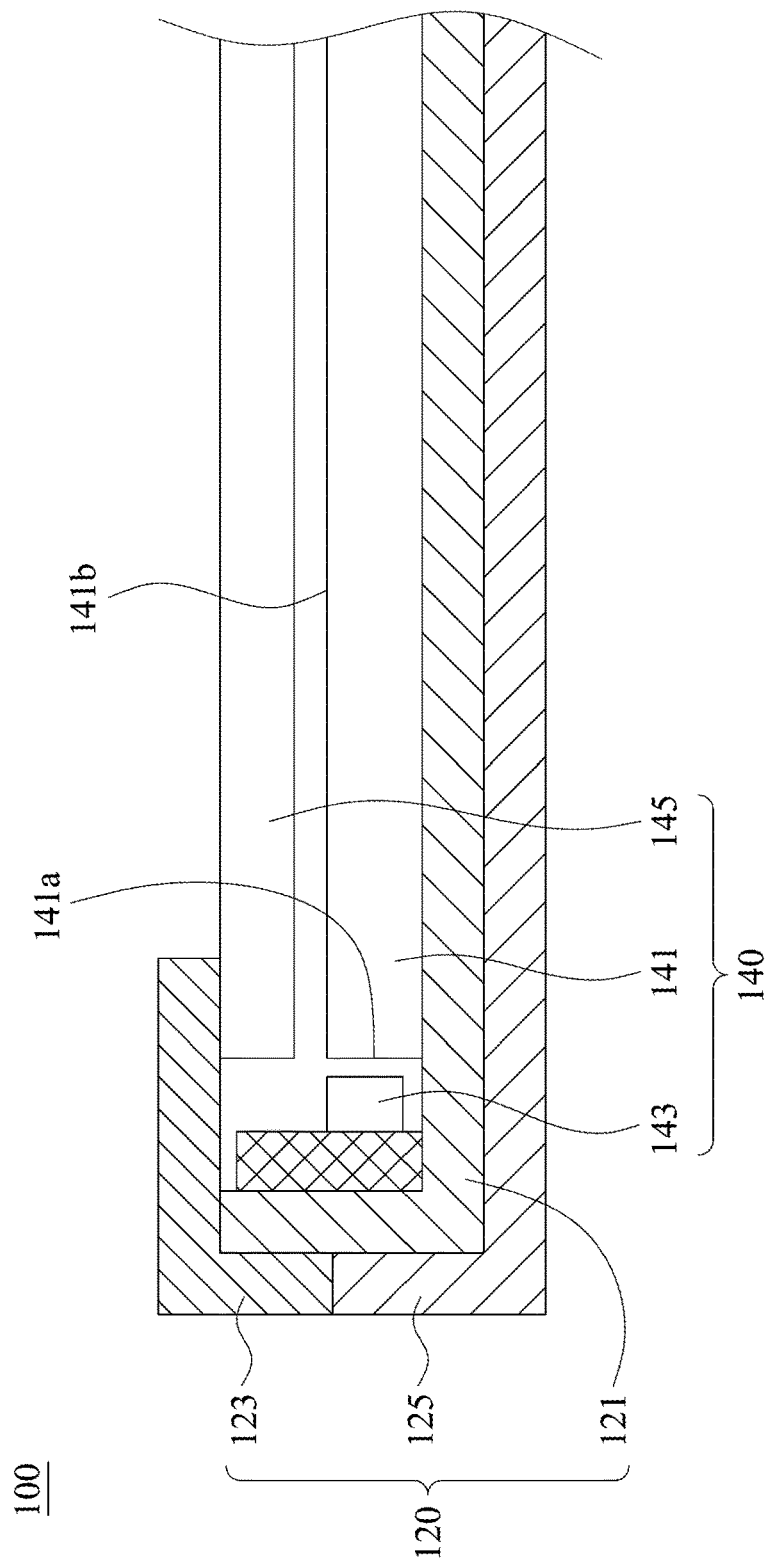
FIG. 1 is a partial cross-sectional view showing a display device in accordance with a first embodiment of the present invention.
Figure 2:
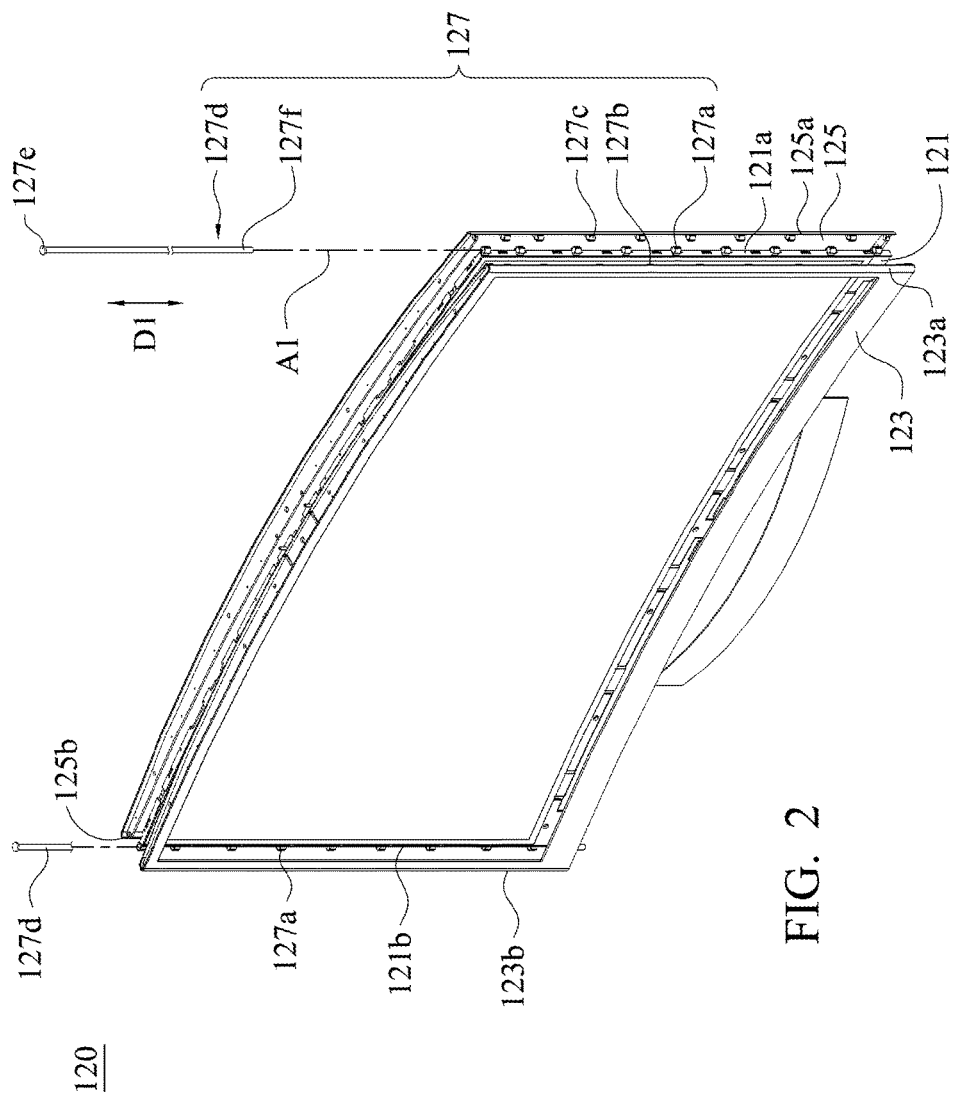
FIG. 2 is a schematic exploded view showing a frame assembly in accordance with the first embodiment of the present invention.
Figure 3:
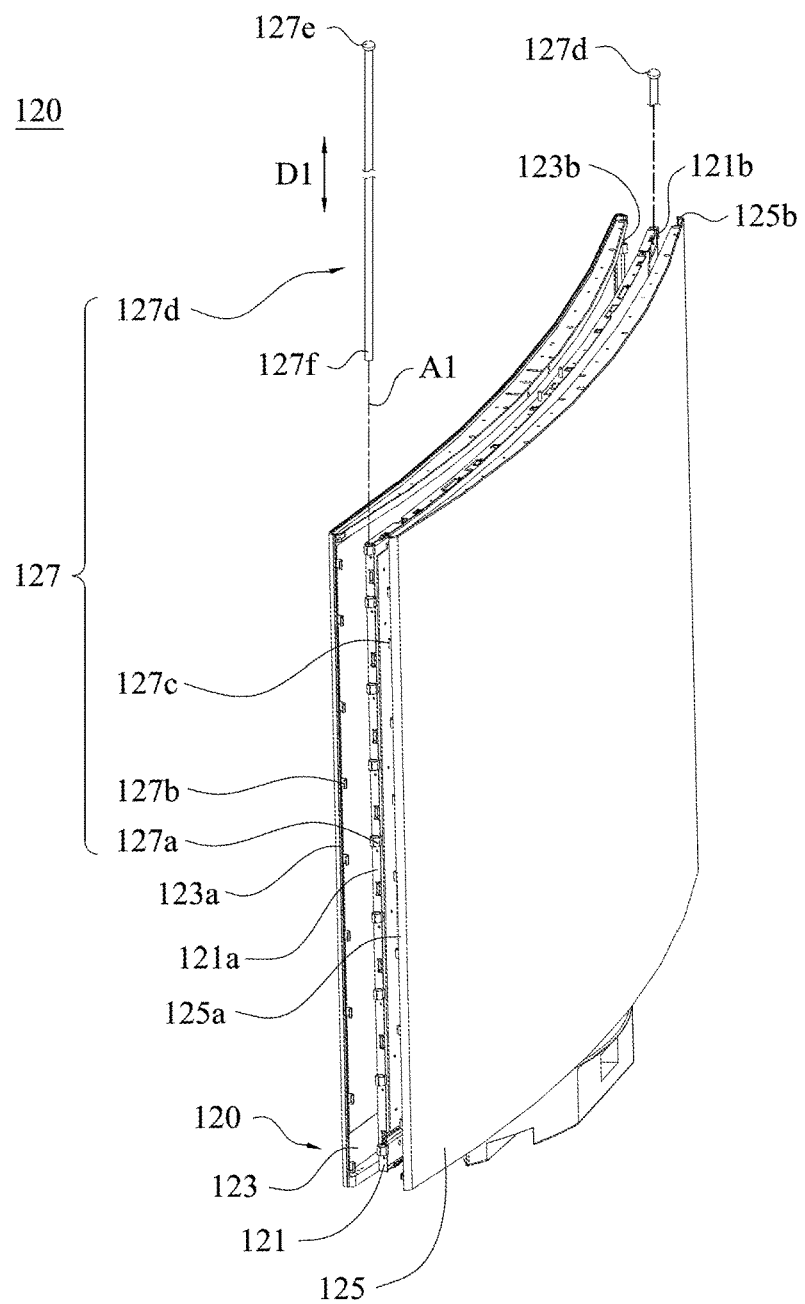
FIG. 3 is another schematic exploded view showing the frame assembly in accordance with the first embodiment of the present invention.

Referring to FIG. 1 to FIG. 3, FIG. 1 is a partial cross-sectional view showing a display device 100 in accordance with a first embodiment of the present invention, and FIG. 2 and FIG. 3 are two schematic exploded views showing a frame assembly 120 in accordance with the first embodiment of the present invention. The display device 100 of the present embodiment mainly includes the frame assembly 120 and a display unit 140. The display unit 140 is disposed in the frame assembly 120. The frame assembly 120 includes a back plate 121, a first frame 123, a second frame 125 and a fixing assembly 127. In the present embodiment, the first frame 123 and the second frame 125 are respectively disposed in front of and behind the back plate 121. The fixing assembly 127 is used to combine and fix the back plate 121, the first frame 123 and the second frame 125 to form a combination. In one example, the first frame 123 can be a front frame, and the second frame 125 can be a back cover.

Referring to FIG. 1, the display unit 140 includes a light guide plate 141, a light source 143 and a display panel 145. The light guide plate 141 is disposed in the back plate 121, and the light guide plate 141 has a light-incident surface 141a and a light-emitting surface 141b connected to the light-incident surface 141a. The light source 143 is also disposed in the back plate 121 and located adjacent to the light-incident surface 141a of the light guide plate 141. As shown in FIG. 1, the display panel 145 is disposed in front of the light-emitting surface 141b of the light guide plate 141. In the present embodiments, the first frame 123 is a hollow frame structure and surrounds the display panel 145.

Simultaneously referring to FIG. 2 and FIG. 3, the back plate 121 has a side edge 121a, and the side edge 121a has an extending direction D1. The first frame 123 has a side edge 123a, and the second frame 125 has a side edge 125a. The side edge 123a and the side edge 125a are corresponding to the side edge 121a of the back plate 121. As shown in FIG. 2 and FIG. 3, the fixing assembly 127 includes at least one first engaging structure 127a, at least one second engaging structure 127b, at least one third engaging structure 127c and a fixing member 127d. The first engaging structure 127a is disposed on the side edge 121a of the back plate 121, the second engaging structure 127b is disposed on the side edge 123a of the first frame 123, and the third engaging structure 127c is disposed on the side edge 125a of the second frame 125. The fixing member 127d is inserted into the first engaging structure 127a, the second engaging structure 127b and the third engaging structure 127c, so as to fix the back plate 121, the first frame 123 and the second frame 125 together.

Referring to FIG. 2 and FIG. 3 again, in one embodiment, each of the first engaging structure 127a, the second engaging structure 127b and the third engaging structure 127c is an annular structure, and these annular structures are alternately disposed. When the back plate 121, the first frame 123 and the second frame 125 are stacked together, respective centers of each of the first engaging structure 127a, the second engaging structure 127b and the third engaging structure 127c are located on the same axis A1. In the present embodiment, the axis A1 is parallel to the extending direction D1. In some examples, each of the annular structures can be an open annular structure, such as a C-like structure. In other examples, each of the annular structures can be an enclosed annular structure, such as O-like structure.

Figure 4:
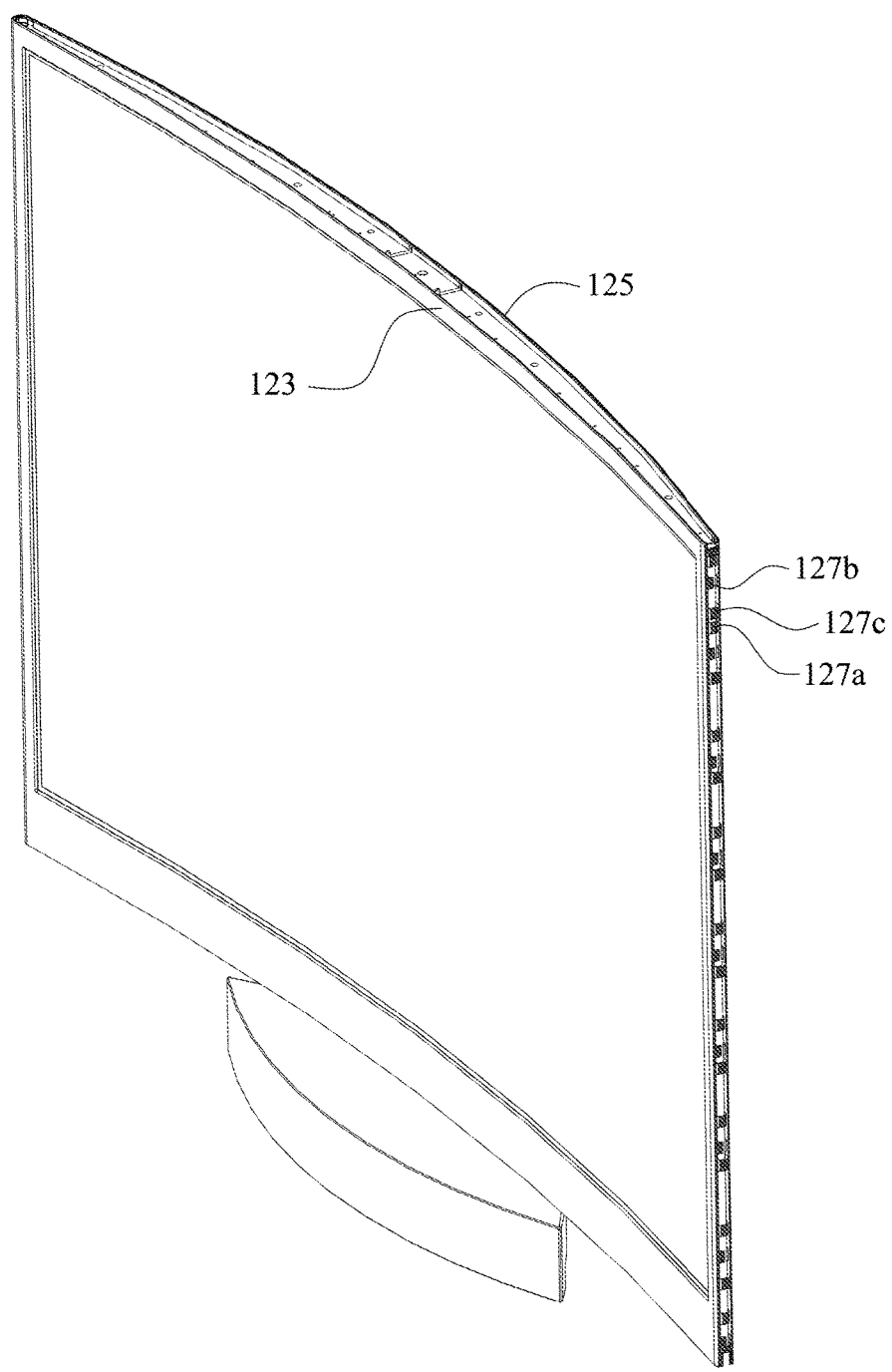
FIG. 4 is a schematic structural diagram showing the display device in accordance with the first embodiment of the present invention.
Figure 5:
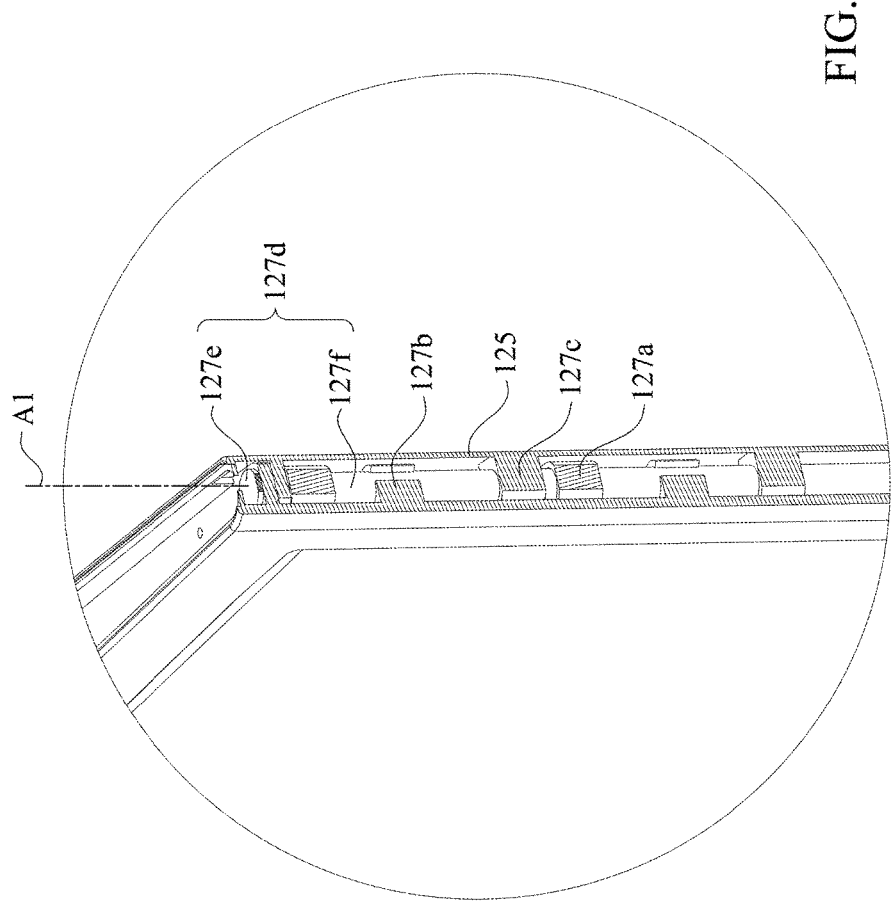
FIG. 5 is a partial enlarged schematic diagram of FIG. 4.

Referring to FIG. 3 to FIG. 5, in which FIG. 4 is a schematic structural diagram showing the display device 100 in accordance with the first embodiment of the present invention, and FIG. 5 is a partial enlarged schematic diagram of FIG. 4. As shown in FIG. 3 to FIG. 5, the fixing member 127d of the present embodiment is an elongated rod. The fixing member 127d has a head portion 127e and a rod portion 127f connected to the head portion 127e. An outer profile dimension of the head portion 127e is greater than an inner profile dimension of each of the first engaging structure 127a, the second engaging structure 127b and the third engaging structure 127c. Therefore, after the rod portion 127f of the fixing member 127d is inserted into the first engaging structure 127a of the back plate 121, the second engaging structure 127b of the first frame 123 and the third engaging structure 127c of the second frame 125, the head portion 127e is unable to pass through the first engaging structure 127a, the second engaging structure 127b and the third engaging structure 127c, thus preventing the fixing member 127d from slipping off, so that the fixing member 127d can be firmly engaged with the back plate 121, the first frame 123 and the second frame 125.

Referring to FIG. 2 and FIG. 3 again, the back plate 121 has a side edge 121b opposite to the side edge 121a, the first frame 123 has a side edge 123b opposite to the side edge 123a, and the second frame 125 has a side edge 125b opposite to the side edge 125a. The first engaging structure 127a, the second engaging structure 127b, the third engaging structure 127c and the fixing member 127d of the fixing assembly 127 may also be disposed on the side edges 121b, 123b and 125b, such that two opposite side edges of each of the back plate 121, the first frame 123 and the second frame 125 can be simultaneously fixed to achieve the aforementioned objects.

It is noted that, the "side edges" as used in the aforementioned embodiment which refers to "shorter side edges" of the back plate, the first frame and the second frame is merely used as an example for explanation, and embodiments of the present invention are not limited thereto. In other embodiments, "side edges" also can refer to "longer side edges" of the back plate, the first frame and the second frame. Moreover, the fixing assembly of the present embodiment is not limited to being disposed on both side edges of the combination of the back plate, the first frame and the second frame. In other embodiments, the fixing assembly is disposed on only one side edge of the combination of the back plate, the first frame and the second frame.

Moreover, as shown in FIG. 2 and FIG. 3, both of a size of the first frame 123 and a size of the second frame 125 are approximately greater than the back plate 121, so as to cover the back plate 121. In addition, the first engaging structure 127a is disposed on an outer side of the side edge 121a of the back plate 121. The second engaging structure 127b and the third engaging structure 127c are respectively disposed on an inner side of the side edge 123a of the first frame 123 and an inner side of the side edge 125a of the second frame 125. Therefore, when the back plate 121, the first frame 123 and the second frame 125 are combined with each other, the first engaging structure 127a and the second engaging structure 127b can be accepted between the first frame 123 and the second frame 125, thus making the display device 100 look more simple and appealing.

Figure 6:
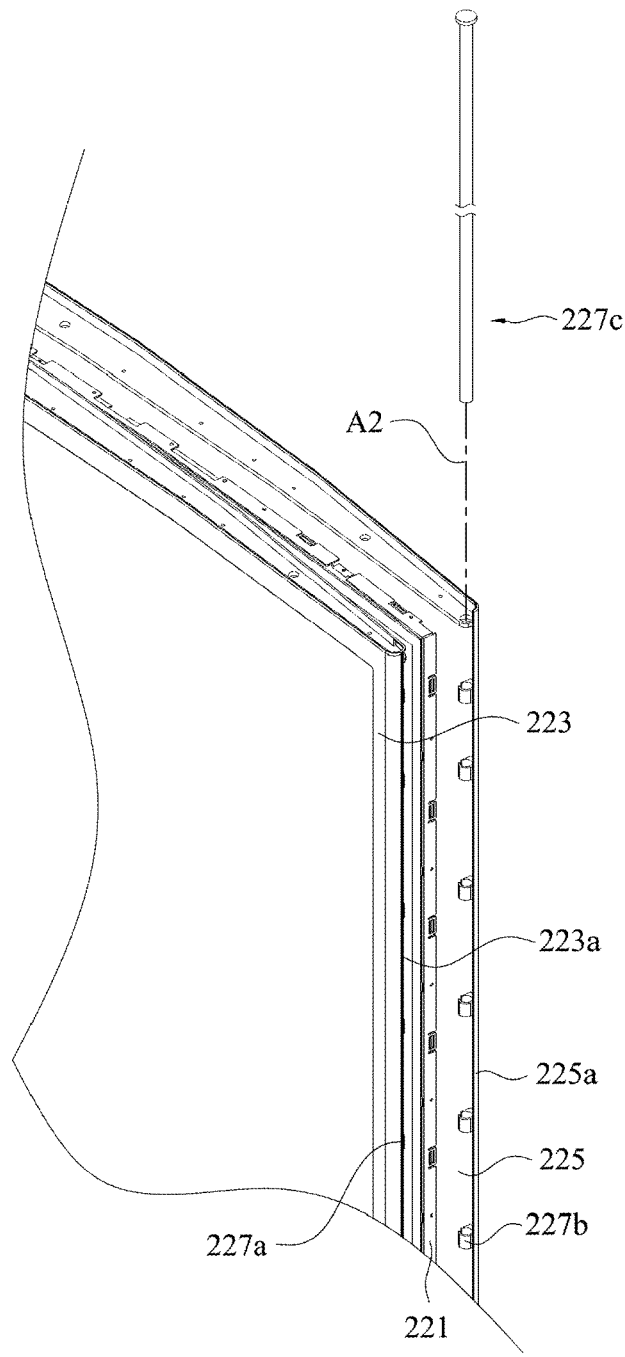
FIG. 6 is a schematic exploded view showing a frame assembly in accordance with a second embodiment of the present invention.
Figure 7:
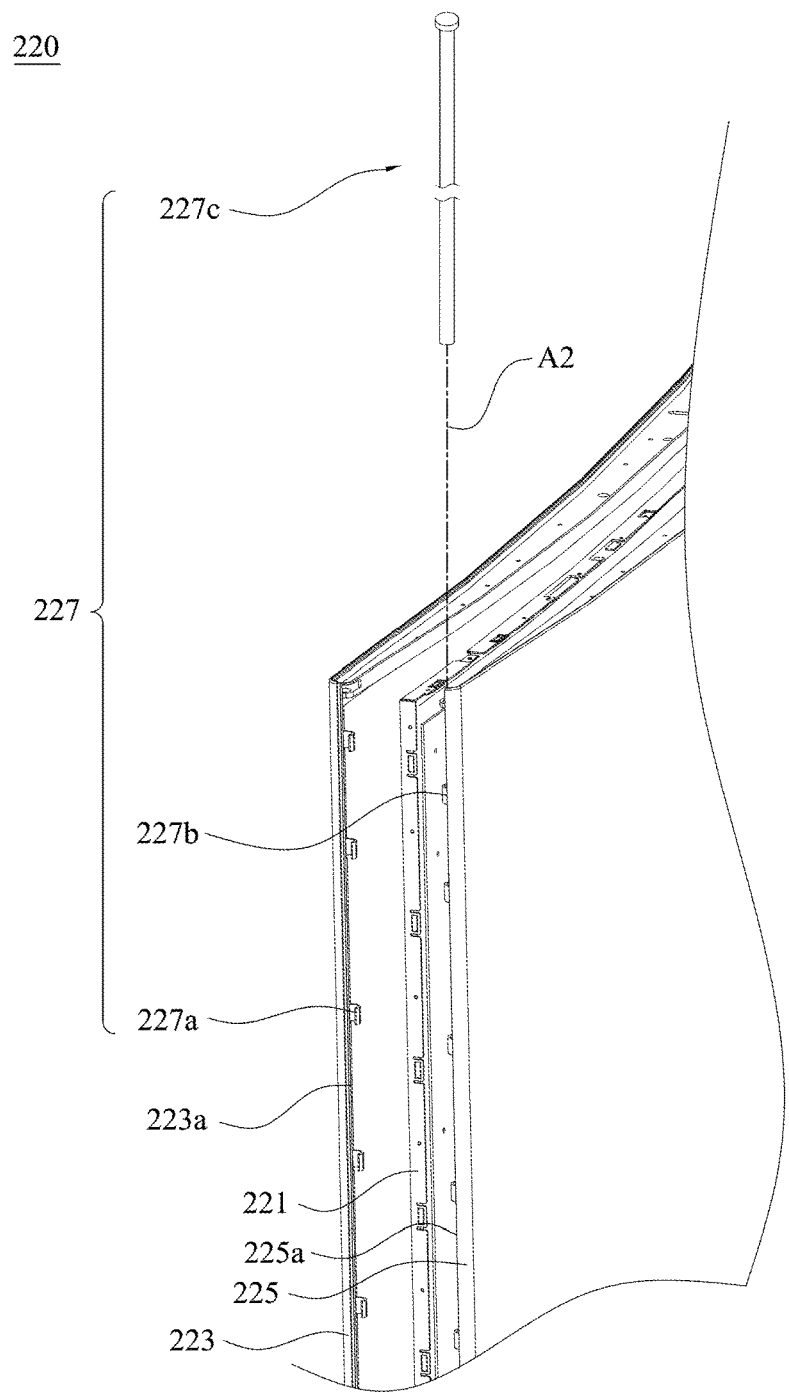
FIG. 7 is another schematic exploded view showing the frame assembly in accordance with the second embodiment of the present invention.

In the present invention, the frame assembly may have different designs. Simultaneously referring to FIG. 6 and FIG. 7, FIG. 6 and FIG. 7 are two schematic exploded views showing a frame assembly 220 in accordance with a second embodiment of the present invention. The frame assembly 220 of the present embodiment includes a back plate 221, a first frame 223, a second frame 225 and a fixing assembly 227. Similarly, the frame assembly 220 of the present invention can be used to accommodate the display unit 140 shown in FIG. 1, so as to make the display device 100 look more appealing and easily processed.

Referring to FIG. 6 and FIG. 7 again, the fixing assembly 227 includes at least one first engaging structure 227a, at least one second engaging structure 227b and a fixing member 227c. The first engaging structure 227a is disposed on a side edge 223a of the first frame 223, and the second engaging structure 227b is disposed on a side edge 225a of the second frame 225. Similarly, each of the first engaging structure 227a and the second engaging structure 227b is an annular structure, and these annular structures are alternately disposed. When the back plate 221, the first frame 223 and the second frame 225 are stacked together, respective centers of each of the first engaging structure 227a and the second engaging structure 227b are located on the same axis A2. In the present embodiment, one of the first frame 223 and the second frame 225 is engaged and fixed with the back plate 221. In some examples, the first frame 223 and the second frame 225 can be made of plastic having elasticity itself, which enables the first frame 223 and the second frame 225 to be elastically engaged with the back plate 221. Therefore, by inserting the fixing member 227c along the axis A2 to the first engaging structure 227a and the second engaging structure 227b, the back plate 221, the first frame 223 and the second frame 225 can be firmly engaged together.

As shown in FIG. 6 and FIG. 7, both of a size of the first frame 223 and a size of the second frame 225 are approximately greater than the back plate 221, so as to cover the back plate 221. In addition, the first engaging structure 227a is disposed on an inner side of the side edge 223a of the first frame 223. The second engaging structure 227b is disposed on an inner side of the side edge 225a of the second frame 225. Therefore, when the back plate 221, the first frame 223 and the second frame 225 are combined with each other, the first engaging structure 227a and the second engaging structure 227b can be accepted between the first frame 223 and the second frame 225, thus making the frame assembly 220 look more simple and appealing.

Figure 8:
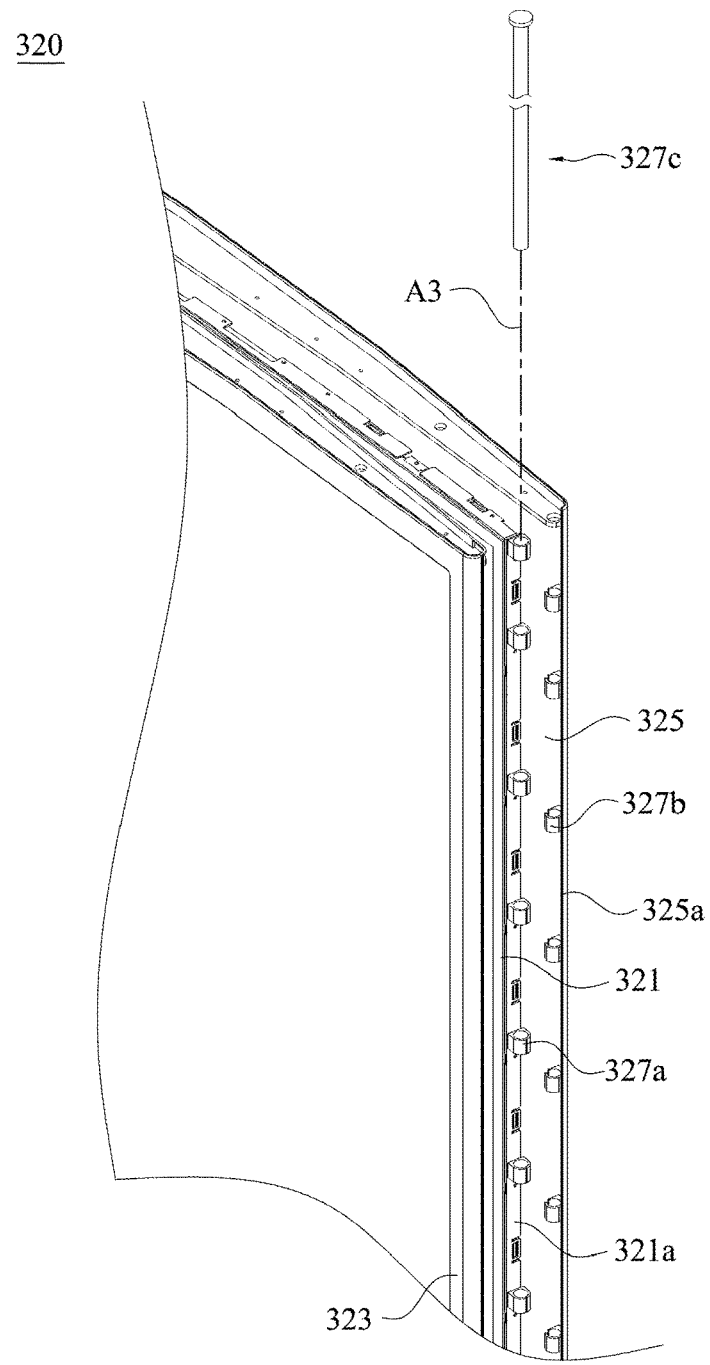
FIG. 8 is a schematic exploded view showing a frame assembly in accordance with a third embodiment of the present invention.
Figure 9:
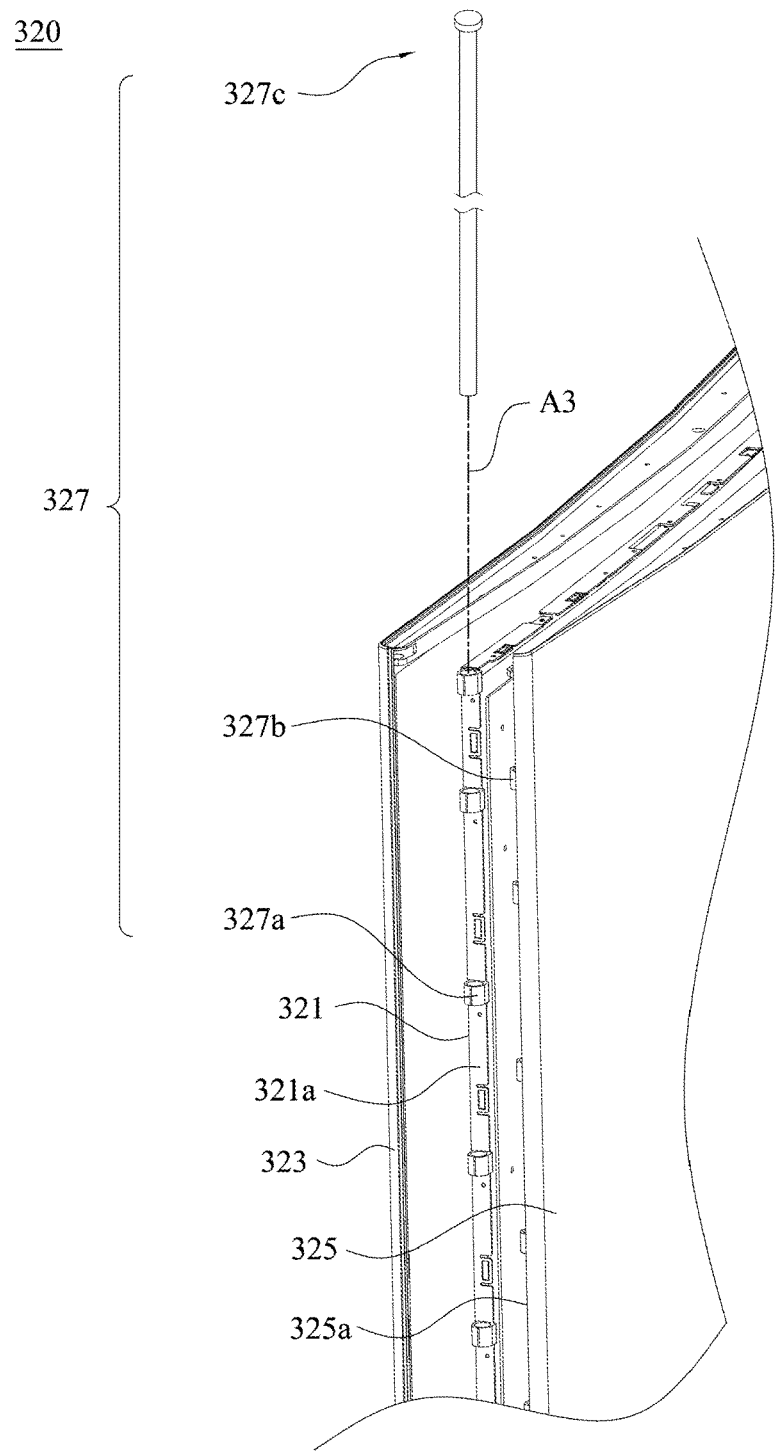
FIG. 9 is another schematic exploded view showing the frame assembly in accordance with the third embodiment of the present invention.

In the present invention, the frame assembly may have different designs. Simultaneously referring to FIG. 8 and FIG. 9, FIG. 8 and FIG. 9 are two schematic exploded views showing a frame assembly 320 in accordance with a third embodiment of the present invention. The frame assembly 320 of the present embodiment includes a back plate 321, a first frame 323, a second frame 325 and a fixing assembly 327. Similarly, the frame assembly 320 of the present invention can be used to accommodate the display unit 140 shown in FIG. 1, so as to make the display device look more appealing and easily processed.

Referring to FIG. 8 and FIG. 9 again, the fixing assembly 327 includes at least one first engaging structure 327a, at least one second engaging structure 327b and a fixing member 327c. The first engaging structure 327a is disposed on a side edge 321a of the back plate 321, and the second engaging structure 327b is disposed on a side edge 325a of the second frame 325. Similarly, each of the first engaging structure 327a and the second engaging structure 327b is an annular structure, and these annular structures are alternately disposed. When the back plate 321, the first frame 323 and the second frame 325 are stacked together, respective centers of each of the first engaging structure 327a and the second engaging structure 327b are located on the same axis A3. In the present embodiment, the first frame 323 can be engaged and fixed with the back plate 321 and/or the second frame 325. In assembling process, the fixing member 327c is first inserted into the first engaging structure 327a and the second engaging structure 327b along the axis A3, so as to combine the back plate 321 with the second frame 325. Thereafter, the first frame 323 is engaged on the back plate 321 and the second frame 325 by its elasticity, so that the first frame 323 and the second frame 325 can be firmly engaged together.

Moreover, as shown in FIG. 8 and FIG. 9, both of a size of the first frame 323 and a size of the second frame 325 are approximately greater than the back plate 321, so as to cover the back plate 321. In addition, the first engaging structure 327a is disposed on an outer side of the side edge 321a of the back plate 321, and the second engaging structure 327b is disposed on an inner side of the side edge 325a of the second frame 325. Therefore, when the back plate 321, the first frame 323 and the second frame 325 are combined with each other, the first engaging structure 327a and the second engaging structure 327b can be accepted between the first frame 323 and the second frame 325, thus making the frame assembly 320 look more simple and appealing.

It is noted that the first engaging structure 327a which is disposed on the back plate 321 and the second engaging structure 327b which is disposed on the second frame 325 are merely used as an example for explanation, and embodiments of the present invention are not limited thereto. In other embodiments, the second engaging structure 327b can be disposed on the first frame 323, and the second frame 325 can be elastically engaged with the first frame 323 and/or the back plate 321, thus achieving the aforementioned objects.

It can be known from the aforementioned embodiments of the present invention that, the engaging structures are disposed internally in the back plate, the first frame and the second frame, and then the back plate, the first frame and the second frame are jointed together by inserting the fixing member into the engaging structures, thereby greatly reducing the number of the screws and screws holes, and simplifying the structure of the frame assembly and the assembling process thereof, thus making the frame assembling more appealing.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A frame assembly, comprising:
    a back plate comprising two long sides each extending substantially along a lengthwise direction, and two short sides each extending along a width direction and each interconnecting the long sides at opposite ends thereof along the width direction, wherein the back plate further has a thickness direction that is perpendicular to the width direction and perpendicular to at least a portion of the lengthwise direction;
    a first frame combined with the back plate, and comprising two long sides and two short sides interconnecting the long sides; and
    a fixing assembly, comprising:
        at least one first engaging structure disposed on the at least one short sides of the back plate;
        at least one second engaging structure disposed on at least one short sides of the first frame; and
        a fixing member combined with the at least one first engaging structure and the at least one second engaging structure along the width direction of the short sides of the back plate;
    wherein the at least one first engaging structure and the at least one second engaging structure are alternately disposed along the width direction of the short sides of the back plate, the at least one first engaging structure and the at least one second engaging structure are disposed coaxially with an axis, and the axis is parallel to the width direction of the short sides of the back plate and perpendicular to the thickness direction of the back plate.

2. The frame assembly of claim 1, further comprising a second frame, wherein
    the second frame comprising two long sides and two short sides interconnecting the long sides;
    the back plate is combined between the first frame and the second frame;
    the fixing assembly further comprises at least one third engaging structure disposed on at least one short side of the second frame; and
    the fixing member is combined with the at least one third engaging structure.

3. The frame assembly of claim 2, wherein each of the first engaging structure, the second engaging structure and the third engaging structure is an annular structure.

4. The frame assembly of claim 3, wherein the annular structures are alternately disposed and disposed coaxially with the axis.

5. The frame assembly of claim 3, wherein each of the annular structures is an open annular structure.

6. The frame assembly of claim 3, wherein the fixing member comprises a head portion and a rod portion connected to the head portion, the rod portion is inserted into the at least one engaging structure, at least one second engaging structure and at least one third engaging structure, and an outer profile dimension of the head portion is greater than an inner profile dimension of each of the annular structures.

7. A display device, comprising:
    a frame assembly as claimed in claim 1; and
    a display unit disposed in the frame assembly.

8. The display device of claim 7, wherein the display unit comprises:
    a light guide plate disposed on the back plate, wherein the light guide plate has a light-incident surface and a light-emitting surface connected to the light-incident surface;
    a light source disposed adjacent to the light-incident surface; and
    a display panel disposed in front of the light-emitting surface.

9. The frame assembly of claim 3, wherein each of the annular structures is an enclosed annular structure.

10. The frame assembly of claim 1, wherein the fixing member comprises a head portion and a rod portion connected to the head portion, and the rod portion passes through each of the at least one first engaging structure and the at least one second engaging structure in the width direction of the short sides of the back plate and perpendicular to the thickness direction of the back plate.

11. The frame assembly of claim 1, wherein the lengthwise direction of each of the long sides of the back plate is curved.

12. A display device, comprising:
    a frame assembly, comprising:
        a first frame having two long sides each extending substantially along a lengthwise direction, and two short sides each extending along a width direction and each interconnecting the long sides at opposite ends thereof along the width direction, wherein the first frame further has a thickness direction that is perpendicular to the width direction and perpendicular to at least a portion of the lengthwise direction;
        a second frame having two long sides and two short sides interconnecting the long sides;
        a back plate located between the first frame and the second frame; and
    a fixing assembly, comprising:
        at least one first engaging structure disposed on the at least one short sides of the first frame;
        at least one second engaging structure disposed on the at least one short sides of the second frame; and
        a fixing member inserted into and combined with the at least one first engaging structure and the at least one second engaging structure along the width direction of the short sides of the first frame; and
        wherein the at least one first engaging structure and the at least one second engaging structure are alternately disposed along the width direction of the short sides of the first frame, the at least one first engaging structure and the at least one second engaging structure are disposed coaxially with an axis, and the axis is parallel to the width direction of the short sides of the first frame and perpendicular to the thickness direction of the first frame;
a display unit combined with the back plate of the frame assembly and located between the first frame and the second frame.

13. The display device of claim 12, wherein the display unit comprises:
a light guide plate disposed on the back plate, wherein the light guide plate has a light-incident surface and a light-emitting surface connected to the light-incident surface;
a light source disposed adjacent to the light-incident surface; and
a display panel disposed in front of the light-emitting surface.

14. The display device of 13, wherein one of the first frame and the second frame is engaged and fixed with the back plate.

15. The display device of 13, wherein the second frame is located behind the back plate of the frame assembly.

16. The display device of claim 13, wherein the first frame is located in front of and surrounds the display panel.

17. The display device of claim 12, wherein one of the first frame and the second frame is engaged and fixed with the back plate.

18. The display device of claim 12, wherein the second frame is located behind the back plate of the frame assembly.

19. A frame assembly, comprising:
a back plate comprising two long sides each extending substantially along a lengthwise direction, and two short sides each extending along a width direction and each interconnecting the long sides at opposite ends thereof along the width direction, wherein the back plate further has a thickness direction that is perpendicular to the width direction and perpendicular to at least a portion of the lengthwise direction;
a first frame combined with the back plate, and comprising two long sides and two short sides interconnecting the long sides; and
a fixing assembly, comprising:
at least one first engaging structure disposed on the at least one long sides of the back plate;
at least one second engaging structure disposed on at least one long sides of the first frame; and
a fixing member combined with the at least one first engaging structure and the at least one second engaging structure along the lengthwise direction of the long sides of the back plate;
wherein the at least one first engaging structure and the at least one second engaging structure are alternately disposed along the lengthwise direction of the long sides of the back plate, the at least one first engaging structure and the at least one second engaging structure are disposed coaxially with an axis, and the axis is parallel to the lengthwise direction of the long sides of the back plate and perpendicular to the thickness direction of the back plate.

20. A display device, comprising:
a frame assembly, comprising:
a first frame having two long sides each extending substantially along a lengthwise direction, and two short sides each extending along a width direction and each interconnecting the long sides at opposite ends thereof along the width direction, wherein the first frame further has a thickness direction that is perpendicular to the width direction and perpendicular to at least a portion of the lengthwise direction;
a second frame having two long sides and two short sides interconnecting the long sides;
a back plate located between the first frame and the second frame; and
a fixing assembly, comprising:
at least one first engaging structure disposed on the at least one long sides of the first frame;
at least one second engaging structure disposed on the at least one long sides of the second frame; and
a fixing member inserted into and combined with the at least one first engaging structure and the at least one second engaging structure along the lengthwise direction of the long sides of the first frame; and
wherein the at least one first engaging structure and the at least one second engaging structure are alternately disposed along the lengthwise direction of the long sides of the first frame, the at least one first engaging structure and the at least one second engaging structure are disposed coaxially with an axis, and the axis is parallel to the lengthwise direction of the long sides of the first frame and perpendicular to the thickness direction of the first frame;
a display unit combined with the back plate of the frame assembly and located between the first frame and the second frame.

* * * * *